United States Patent [19]

Weibel et al.

[11] Patent Number: 4,722,508

[45] Date of Patent: Feb. 2, 1988

[54] VALVE ON PROCESSING PLANT

[75] Inventors: Hans Weibel; Martin Steiner, both of Liestal; Max Grieder, Technau, all of Switzerland

[73] Assignee: Rosenmund AG, Liestal, Switzerland

[21] Appl. No.: 789,834

[22] Filed: Oct. 21, 1985

[30] Foreign Application Priority Data

Oct. 31, 1984 [CH] Switzerland .................. 194/84

[51] Int. Cl.[4] .................. F16K 31/50; F16K 41/10
[52] U.S. Cl. .................. 251/266; 251/333; 251/335.3; 251/357; 251/361
[58] Field of Search .............. 251/333, 334, 359, 357, 251/335.3, 335.2, 335.1, 272, 362, 361, 266, 263, 268, 269, 270, 271

[56] References Cited

U.S. PATENT DOCUMENTS

| 273,284 | 3/1883 | Jenkins | 251/357 |
| 1,311,364 | 7/1919 | White | 251/357 X |
| 1,478,815 | 12/1923 | Blauvelt | 251/269 |
| 1,493,253 | 5/1924 | Eggleston | 251/270 |
| 1,833,193 | 11/1931 | Wray | 251/357 |
| 1,906,313 | 5/1933 | Clifford | 251/335.3 |
| 2,301,276 | 11/1942 | Gussick | 251/361 |
| 2,596,419 | 5/1952 | Lowe et al. | 251/272 |

FOREIGN PATENT DOCUMENTS

| 546502 | 9/1957 | Canada | 251/333 |
| 979441 | 1/1965 | United Kingdom | 251/272 |
| 2038451 | 7/1980 | United Kingdom | 251/334 |
| 291064 | 4/1971 | U.S.S.R. | 251/334 |

OTHER PUBLICATIONS

Shpil'rain et al, "All-Metal Bellows Valve", *Zavodskaya Laboratoriya*, vol. 42, No. 6, p. 717; Jun. 1976.

*Primary Examiner*—Gerald A. Michalsky
*Attorney, Agent, or Firm*—Walter C. Farley

[57] ABSTRACT

In a valve on a processing plant in the chemical apparatus field, which has a valve housing, a feed flange and a discharge shaft, together with a valve seat arranged in the vicinity of the feed flange and an associated valve cone, at least the contacting parts of the valve seat and valve cone are made from metal. The inner wall of the valve seat formed as a surface of revolution is provided in the flow direction with two adjacent areas having different diameters and which are separated from one another by an edge. When the valve is closed, only the valve seat edge engages on the circumferential surface of the valve cone. In the first area facing the feed flange, the valve seat wall preferably has a substantially constant radius which continuously increases in the flow direction in the following second area, resulting in particularly reliable closing behavior. This can be further aided by an axially acting spring element. This construction is particularly advantageous for dosing a material flow from a pressure vessel connected to the feed flange which has a higher internal pressure than the valve housing.

6 Claims, 3 Drawing Figures

VALVE ON PROCESSING PLANT

BACKGROUND OF THE INVENTION

The present invention relates to a valve on a processing plant in the chemical equipment field, as well as to a use of such a valve.

In the chemical equipment field, particularly in processing plants for products of the chemical or pharmaceutical industries, particularly high cleanness demands are made with respect to those parts of the plant coming into direct contact with the product, e.g. in connection with the sterility thereof. It is particularly difficult to fulfil this requirement on complicated mechanical parts, such as e.g. on valves. It is relatively easy for contaminants to pass from the outside on to the inner walls of the plant and consequently on to the product via adjustment elements for said valves or shaft packings. Another requirement, which is often difficult to fulfil on critical plant parts is the desired freedom from particles of the product and this must be ensured to a very high degree. This means that substantially no particles must pass from parts of the plant into the product, so that the high cleanness and therefore effectiveness thereof and possible its sterility are ensured.

In order to fulfil this first requirement, those parts of the plant coming into contact with the product have to be sterilised after processing a certain number of charges. According to the prior art for the purposes of sterilising the plant parts, it is on the one hand necessary to correspondingly and generally manually treat the accessible inner area and on the other hand complicated and in particular fissured parts of the plant are removed, separately cleaned, sterilised and then installed again. Particular attention must be paid to the seals or packings on the valve, because they are made form elastic material, e.g. an elastomer. These valve packings are subject to abrasion, so that on the one hand they can prejudice the required freedom from particles of the product and on the other it is in certain circumstances impossible to sufficiently reliably ensure the necessary sealing action. Therefore particular care must be taken in connection with the construction, so that the following charges satisfy the necessary requirements. If this does not occur, the following charges would be spoiled, which would lead to considerable economic and financial losses. Finally, the design of known valves based on technical circumstances alway gives rise to objections with respect to that area of the valve housing used for discharging the product, because the latter can only inadequately be removed from the housing, so that further problems occur during the cleaning and/or sterilisation process.

SUMMARY OF THE INVENTION

An object of the present invention is to improve the valve on processing plant of the given type in that the plant reliability is considerably increased and consequently the output and efficiency thereof can significantly rise. It would therefore be desirable for the requisite plant parts to be easily and reliably sterilisable, whilst maintaining the sterilisation conditions over a certain number of charges to be processed.

Briefly described, the invention includes a valve in a processing plant including a movable valve cone, a valve casing with an inlet opening, a discharging conduit, a feed flange around the inlet opening and a valve seat adjacent the feed flange and a device extending into the interior of the casing for supporting the valve cone for movement between closed and open positions against and away from the valve seat. The device includes a drive for moving the cone, the drive being of a type which is not driven backward by forces acting on the cone. The cone has a replaceable hard metal insert ring in the area of contact with the seat, and the seat is made of a replaceable ring element having a metal softer than the insert ring metal at least where it is contacted by the cone. The seat has two surfaces of revolution of different diameters near each other but separated by an edge which defines a contact line with the cone. A bellows surrounds and seals the drive from the remainder of the casing interior, the ends of the bellows being attached respectively to a sealing flange attached to the casing and to a flange which is attached to and movable with the cone.

An important advantage of this construction is the possibility of being able to carry out the cleaning and sterilisation of the valve on the actual plane, i.e. without prior dismantling and subsequent refitting. The sterilisation can be performed in a much shorter time and with much greater reliability. Therefore it is possible to process a much larger number of charges between the cleaning or sterilisation stages. It is also ensured that no condensate pockets will form during the sterilisation process and which still contain sterilisation medium to be drained off. There is also no risk of abrasive particles forming on the sealing surfaces. Finally the valve has a better closing action, even when processing granular products.

BRIEF DESCRIPTION OF THE DRAWINGS

The invention is described in greater detail hereinafter relative to non-limitative embodiments and with reference to the attached drawings, wherein.

DETAILED DESCRIPTION OF THE PREFERRED EMBODIMENTS

Figure 1:
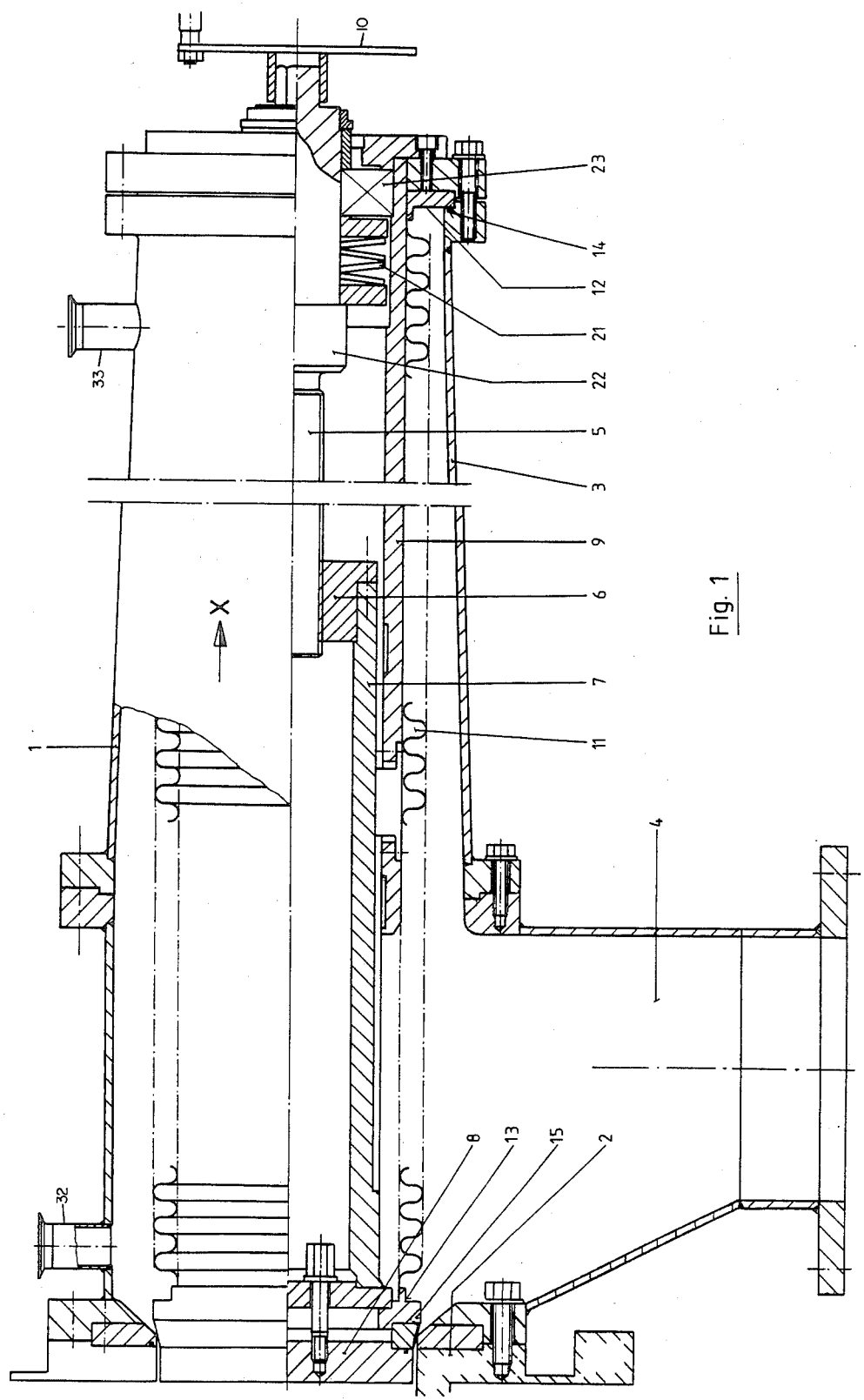
FIG. 1 is a side elevation in longitudinal section of a particularly advantageous embodiment of a valve.

According to FIG. 1 a valve housing 1 is provided with a feed flange 2 by means of which the valve is fitted to the casing of a processing means. The latter can be any chosen part of a plant for the manufacture or processing of flowable or pourable products. In the present case, the casing has a multipart construction and simultaneously serves to support or carry actuating means for adjusting the valve.

The bottom 3 of valve housing 1 slopes in the direction of a discharge shaft 4, so that the product to be processed can be reliably supplied from all the bottom regions of the valve housing to the discharge shaft. Preferably the valve housing area closest to the feed flange 2 is constructed as a discharge shaft. Thus, the product flowing through the valve is fed to the discharge shaft, to the extent possible without detours. As a result of the particularly fovourable main flow direction, the risk of the product remaining stuck to parts of the valve housing and thereby disturbing the free passage through the valve is substantially eliminated.

Valve housing 1 serves as a support for the valve drive, which in the present case comprises a spindle 5 and a driver nut 6. The latter is connected to a sleeve 7, on whose other end is fitted a valve plate 8 to be described in greater detail hereinafter. Sleeve 7 is slidingly guided in a second sleeve 9 and is axially displaceable relative to sleeve 9. The end of the second sleeve 9 remote from the first sleeve is fixed to parts of housing 1. The first sleeve 7 and with it the drive 6 of the spindle are axially guided and prevented from twising in stationary sleeve 9 with the aid of a sliding guide, not shown.

At the far right side in FIG. 1a, a handwheel 10 is positioned at the connecting point between the second sleeve 9 and the valve housing 1 and is connected to spindle 5 and rotatably in housing 1. It is also possible to provide in place of the handwheel another chosen drive, e.g. an electric or hydraulic motor.

The spindle-nut drive, which is used as an irreversible drive, is particularly suitable for the purposes of the present invention, in which the valve must be extremely accurately positioned and in which the processing plant connected to the feed side is under an overpressure compared with the inner area of the valve housing. This pressure relationship causes the valve to have a self-opening tendency which is effectively suppressed by the irreversible drive. Thus, the drive is not driven in the reverse direction by forces acting on the cone.

The complete outside of the sleeves 7 and 9 is covered with a bellows 11, in the present case a metal bellows, which runs coaxially to the sleeves and is fixed and, in the present case, welded at its ends to flange elements 12 and 13, element 12 being fixedly attached to housing 1. Thus, the complete drive part of the valve with its relatively fissured surfaces is hermetically separated from the conveying chamber for the product to be dosed. Thus, with respect to these parts, the same strict requirements regarding the freedom from particles or sterility as for that part of the valve inner area coming into contact with the product to be processed no longer apply. It is particularly advantageous for the intended use to employ a bellows made from particularly strong material, e.g. thin stainless sheet steel.

The valve housing 1 also has at least one sterilisation medium inlet 32. In the present embodiment there is also a second inlet 33. The sterilisation medium can e.g. be superheated steam at a temperature of preferably 120° C., which is fed in for one to two hours. Apart from superheated steam, it is possible to use any selected fluid sterilisation medium.

The steam condensed during the sterilisation process is supplied directly via correspondingly sloping parts of the housing bottom 3 to the discharge shaft 4 and is removed therefrom to the outside. Due to the described construction of the housing bottom 3 and the hermetic encapsulation of all the fissured parts, it is impossible in the represented embodiment for condensate pockets to form, i.e. spaces in which sterilisation fluid condensate collects and which cannot drain off or can only drain off with difficulty.

At its ends, bellows 11 is welded to flange parts 12, 13 which are sealed to components of housing 1 by interposing seals 14 and 15 respectively, so that flange part 13 is movable relative to the housing. This leads to the aforementioned hermetic separation between inner area of the valve housing coming into contact with the product to be processed and that part of the inner area which houses the valve drive. As a result of the described measure, it is possible to simply and reliably sterilise the inner area of the valve housing coming into contact with the product both with the system open and closed.

Preferred constructions of the valve seat and valve cone 17 will now be described relative to FIG. 2. The circumferential surface of valve cone 17 has in the present case a hard metal insert 16, which is embedded in the valve cone. The cone angle $\alpha$ measured against the axis of symmetry according to FIG. 1 is preferably between 10° and 30°. The valve cone 17 is clamped between a valve plate 8 and the movable flange part 13 by a fastening element, e.g. screws 18 connecting the first sleeve 7 to valve plate 8.

The insert 16 on valve cone 17 is used in the present case as a mating surface for a sharp edge 19 on valve seat 20, so that there is a cutting edge-like function on closing the valve. Preferably at least the edge 19 of valve seat 20 is made from a softer metal than that used for insert 16.

The shape of the rotationally symmetrical valve seat 20 surrounds a first part A facing feed flange 2 and which has a substantially constant internal radius. At edge 19, the surface of part A passes into a second part B, whose internal radius constantly increases. In the embodiment according to FIG. 2 the radius even increases uniformly. In the vicinity of edge 19 the two parts A and B enclose an obtuse angle, which is between 120° and 175°, being approximately 135°. As a result of this construction of valve seat 20, it is ensured that product flowing into the valve housing is passed into the discharge shaft 4 below it, preferably with no detours. During the closing of the valve, edge 19 ensures that complete, reliable closure is ensured, even with granular or granulate-like products. There is not substantially no risk of parts of the product jamming between valve seat 20 and valve cone 17 which would impair the dosing quality or security against unintentional penetration of product into the valve housing.

Valve plate 8 has an external radius, which is smaller by a gap S than the internal radius of feed flange 2. This ensures a free inflow of product up to the edge 19 of valve seat 20 and the jamming of parts of the product during the closure of the valve is avoided.

Figure 2:
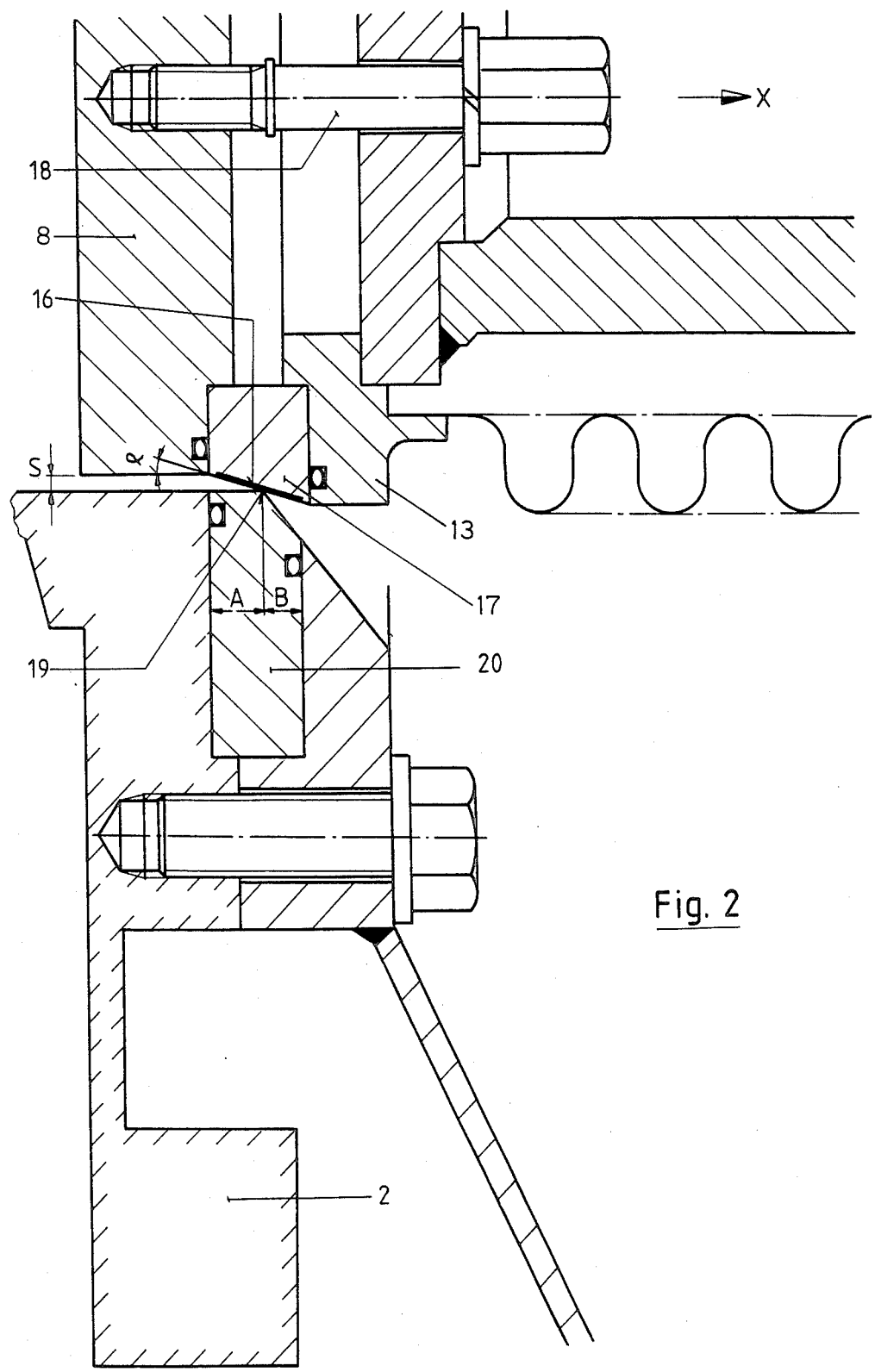
FIG. 2 is an enlarged partial view of the valve according to FIG. 1.
Figure 3:
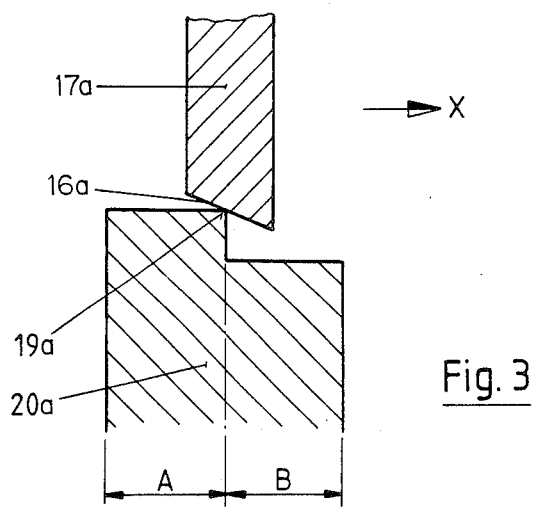
FIG. 3 is an enlarged partial view of a further embodiment of a valve seat according to the invention.

As a variant of the embodiment shown in FIG. 2, the valve seat 20 can also have a different shape, with an edge 19 contacing the outer surface or plate 16 of valve cone 17. A possible embodiment is diagrammatically shown in FIG. 3. Edge 19a follows in the passage direction of flow X and when the valve is closed it engages on insert 16a of valve cone 17a. Edge 19a is followed in the passage flow direction X in valve seat 20a by the second area B, which in the present case also has a substantially constant internal radius, which is larger than the internal radius in area A.

In order to aid the reliable closure of the valve, valve plate 8 is mounted in an axially resilient manner with respect to the valve housing or the valve seat 20 connected thereto. In the preferred example, the springiness is achieved with a helical spring 21 shown in FIG. 1. The helical spring exerts a given spring force between a shoulder 22 of spindle 5 and a block 23, which houses the bearing of the spindle for rotating relative to the valve housing 1 itself. From valve plate 8, the axial pressure is transferred via the first sleeve 7 and driver nut 6 to spindle 6. Thus, with the valve closed, a constant closing pressure defined by the spring tension of spring 25 is applied to valve plate 17 and consequently between the circumferential casing of the valve cone and edge 19 and this ensures a reliable closure of the valve, even when processing a granular product. The springiness is particularly advantageous when closing the valve against a pressure exerted by the inflowing product or the container for the same.

What is claimed is:

1. A valve in a chemical processing plant comprisng the combination of a movable valve cone;

a valve casing having an interior volume, an inlet opening, a feed flange surrounding said inlet opening, a discharge conduit, and a valve seat adjacent said feed flange;

means extending into said interior volume for supporting said valve cone for movement between a closed position in which said valve cone contacts said valve seat to close said inlet opening and an open position in which said cone is separated from said valve seat;

said means for supporting including drive means for moving said valve cone to said open and closed positions, said drive means being irreversible by forces acting directly on said valve cone;

said valve cone having a replaceable hard metal insert ring at said area of mutual contact in said closed position;

said valve seat comprising a replaceable ring element having a metal region at least in the area of mutual contact in said closed position with first and second surfaces of revolution adjacent each other and separated by an edge defining a line of contact with said cone in said closed position, said first surface being upstream of said edge and having a diameter different from said second surface downstream of said edge, the material of said valve seat edge being softer than said hard metal insert ring;

a bellows hermetically sealing said drive means from the remainder of said interior volume of said casing; and first and second sealing flanges attached to opposite ends of said bellows, said first sealing flange being fixedly attached to said casing and said second sealing flange being attached to and movable with said valve cone.

2. A valve according to claim 1 and including a cylindrical valve plate positioned upstream of said valve cone, the outside diameter of said plate being smaller than the inside diameter of said feed flange, whereby a gap of substantially constant width is established between said plate and said flange.

3. A valve according to claim 2, wherein said valve plate is movable with said valve cone.

4. A valve according to claim 1 wherein said drive means includes an externally threaded spindle rotatably mounted in said casing, a drive nut threadedly engaging said spindle so that rotation of said spindle drives said drive nut axially, and means connecting said valve cone to said drive nut.

5. A valve according to claim 4 wherein said means connecting said valve cone to said drive nut comprises a cylindrical drive tube extending between said nut and said valve cone, said drive tube having an outer diameter only slightly less than the diameter of said edge of said valve seat.

6. A valve according to claim 5 and further comprising a guide tube mounted on said casing and partially surrounding said drive tube for guiding said drive tube during longitudinal motion thereof.

* * * * *